United States Patent [19]
Yatsu

[11] Patent Number: 6,085,013
[45] Date of Patent: Jul. 4, 2000

[54] OPTICAL CABLE CLOSURE

[75] Inventor: Hiroyuki Yatsu, Tokyo, Japan

[73] Assignee: The Furukawa Electric Co., Ltd., Tokyo, Japan

[21] Appl. No.: 09/167,972

[22] Filed: Oct. 8, 1998

[30] Foreign Application Priority Data

Oct. 9, 1997 [JP] Japan .................................... 9-277073

[51] Int. Cl.⁷ ...................................................... G02B 6/00
[52] U.S. Cl. .......................................... 385/135; 385/147
[58] Field of Search ................................... 385/135, 136, 385/137, 138, 147

[56] References Cited

U.S. PATENT DOCUMENTS

| | | | |
|---|---|---|---|
| 5,440,666 | 8/1995 | Burek et al. | 385/135 |
| 5,473,724 | 12/1995 | Board et al. | 385/135 |
| 5,481,639 | 1/1996 | Cobb et al. | 385/135 |
| 5,754,724 | 5/1998 | Peterson et al. | 385/135 |

FOREIGN PATENT DOCUMENTS

| | | |
|---|---|---|
| 0213365 A1 | 3/1987 | European Pat. Off. . |
| 0543350 A1 | 5/1993 | European Pat. Off. . |
| 0645656 A1 | 3/1995 | European Pat. Off. . |
| 0797114 A2 | 9/1997 | European Pat. Off. . |
| 2209410 | 5/1989 | United Kingdom . |

*Primary Examiner*—Akm E. Ullah
*Attorney, Agent, or Firm*—Lacasse & Associates; Randy W. Lacasse; Kevin E. Greene

[57] ABSTRACT

The invention provides an optical cable closure of which outer casing is made by joining two half cases on a partition plane and can be made smaller, with no redundant space produced in either of the half cases. A plurality of cable leading holes 4 are provided on only one end of a two-partition type outer casing 1 comprising half cases 1A and 1B of an identical configuration, with the cable leading holes 4 being arranged side by side and divided into halves by a partition plane 5 of the outer casing 1. Plugged into each cable leading hole 4 and supported therein is an end plate 6 which fits around the circumference of the optical cable 3 and seals the cable leading hole 4. The end plate 6 has a cable passing hole 6a disposed offset from the center line and is aligned in the cable leading hole 4 so that the offset cable passing hole 6a is disposed closer to the bottom side than the partition plane inside one half case 1A. The chamber 2A in the half case 1A wherein the offset cable passing hole 6a exists is made to serve as a cable leading chamber and a linkage frame housing chamber. The chamber 2B in the other half case 1B is made to serve as a redundancy housing case chamber.

2 Claims, 5 Drawing Sheets

OPTICAL CABLE CLOSURE

FIELD OF THE INVENTION

The present invention relates to an optical cable closure for connecting optical cables.

BACKGROUND OF THE INVENTION

Recently, optical cables are increasingly installed in sewer pipes. And optical cable closure used for interconnection of optical cables are often installed along upper walls of manholes.

Figure 8:
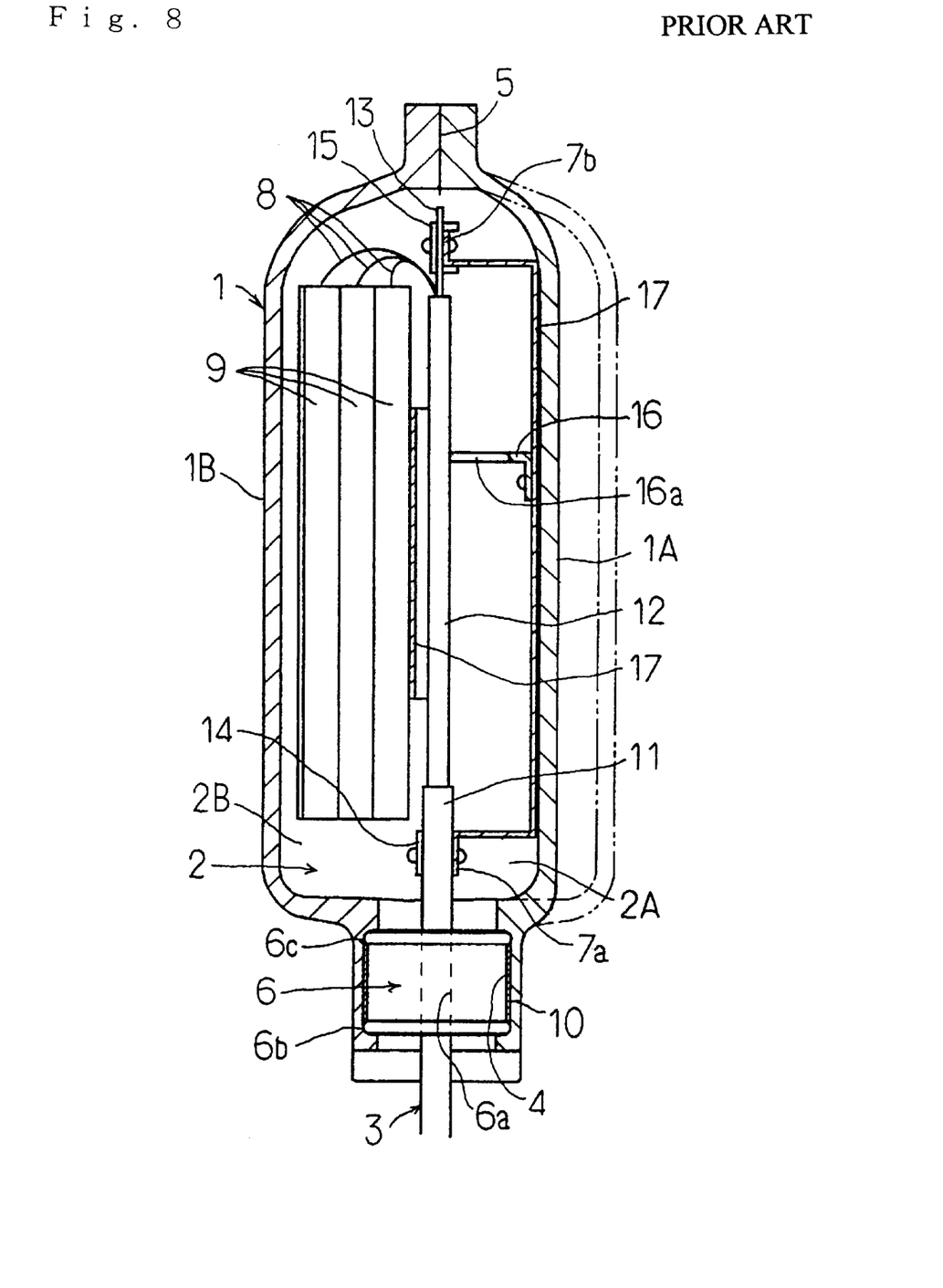
FIG. 8 is a longitudinal sectional view of the optical cable closure of the prior art.

An optical cable closure of the prior art used for such a purpose as described above comprises a two-partition type outer casing 1 wherein a chamber 2 is formed by joining half cases 1A and 1B to face each other as shown in FIG. 8, while the outer casing 1 has a plurality of cable leading holes 4 provided on only one end thereof for introducing end portions of optical cables 3 to be connected, with the cable leading holes 4 being arranged side by side and divided into halves by a partition plane 5 of the outer casing 1. Plugged into each of the cable leading holes 4 and supported therein is an end plate 6 made of rubber having a circular cross section which fits around the circumference of the optical cable 3 and seals the cable leading hole 4. Housed in the chamber 2 of the outer casing 1 are a linkage frame 7, which holds the optical cable 3 and supports a reinforcement member of the optical cable 3, and a redundancy housing case 9 which houses a connecting portion and a redundant portion of optical fiber ribbon 8 of the optical cable 3.

The end plate 6 has a cable passing hole 6a made along the center line thereof and flanges 6b and 6c provided around the circumference at both ends in the direction of the center line, and the end plate 6 is, with a sealing tape 10 wound around the circumference between the flanges 6b and 6c, plugged into the cable leading hole 4 thereby sealing the cable leading hole 4.

Since the cable passing hole 6a of the end plate 6 is provided along the center line of the end plate 6, the end portion of the optical cable 3 is disposed along the partition plane 5 in the chamber 2 of the outer casing 1 as shown in the drawing. The end portion of the optical cable 3 comprises a cable spacer 12 exposed at the end of a sheath 11 and a reinforcement member consisting of a tension member 13 exposed at the end of the cable spacer 12. The cable spacer 12 has a plurality of grooves, which are not shown in the drawing, opening along the longitudinal direction around the circumference thereof, with the optical fiber ribbons 8 being housed in the grooves.

The linkage frame 7 is used for holding the end portion of the optical cable 3 in the chamber 2 and for holding the tension member 13 which is the reinforcement member of the optical cable 3, and has a shape of a bottomed box disposed in the chamber 2A of the half case 1A on one side of the outer casing 1. A cable holder 14 is provided on an upper edge 7a of one end of the linkage frame 7 for holding the optical cable 3, and a reinforcement member holder 15 is provided on an upper edge 7b of the other end for holding the reinforcement member consisting of the tension member 13. Since the end portion of the optical cable 3 is positioned along the partition plane 5, the cable holder 14 and the reinforcement member holder 15 are also provided along the partition plane 5.

Numeral 16 denotes a reinforcement holder fastened onto the linkage frame 7 with screws or the like for holding a metal tube inserted in a holding slit 16a, where in case the optical cable 3 is not provided with the tension member 13 and the slotted cable spacer 12 shown in the drawing, the optical fiber ribbon is housed in the metal tube serving as a reinforcement member instead.

In the chamber 2B of the half case 1B on the opposite side of the outer casing 1, a plurality of redundancy housing cases 9 are stacked for housing connecting portions and redundant portions of the optical fiber ribbons 8. The redundancy housing cases 9 are stacked and supported on a swingable support plate 17 which is placed on the box-shaped linkage frame 7 to span thereover and is pivoted on one side thereof onto the linkage frame 7 to freely open or close.

OBJECT AND SUMMARY OF THE INVENTION

In the optical cable closure of the prior art made in the configuration described above, the half cases 1A and 1B constituting the outer casing 1 are not made in symmetrical configuration with respect to the partition plane 5 because the half case 1A is required to house only the linkage frame 7 and is therefore shallower than the half case 1B, thus making it necessary to make two different half cases 1A and 1B resulting in a high manufacturing cost.

Although such a configuration may be adopted that the half case 1A and the half case 1B are made of identical construction, as indicated in FIG. 8 with a 2-dot and dashed line, thereby reducing the manufacturing cost, such a configuration has problems in that the outer casing 1 becomes larger in size and the half case 1A involves a redundant and empty space.

It is an object of the invention to provide an optical cable closure of which the outer casing can be made smaller while using identical half cases without redundant space produced in either of the half cases.

The optical cable closure of the invention comprises a two-partition type outer casing wherein two identical half cases are joined facing each other to form a chamber therein. The outer casing has a plurality of cable leading holes provided on only one end thereof for introducing end portions of optical cables to be connected, with the cable leading holes being arranged side by side and divided into halves by a partition plane of the outer casing. Plugged into each of the cable leading holes and supported therein is an end plate which fits around the circumference of the optical cable and seals the cable leading hole. Housed in a chamber of the outer casing are a linkage frame which holds the optical cable and supports a reinforcement member of the optical cable, and a redundancy housing case which houses redundant portions of optical fiber ribbons of the optical cables.

In the optical cable closure of the invention, each end plate has a cable passing hole offset from the center line of the end plate. The end plate is aligned in the cable leading hole of the outer casing so that the offset cable passing hole exists inside one of the half cases. The chamber in one of the half cases on the side, where the offset cable passing hole of the end plate exists in the outer casing, is made to serve as a cable leading chamber and a linkage frame housing chamber. The chamber in the other half case of the outer casing is made to serve as a redundancy housing chamber.

Thus the optical cables can be introduced in one of the half cases even when the outer casing is made from identical half cases unlike the outer casing of the prior art, in case the end plate which is plugged in each cable leading hole of the outer casing has the cable passing hole offset from the center of the end plate, and the end plate is aligned in the cable leading hole of the outer casing so that the offset cable passing hole exists inside one of the half cases. Consequently, the chamber in one of the half cases serves as a cable leading chamber and a linkage frame housing chamber. When the chamber in one of the half cases is used as the cable leading chamber as well as the linkage frame housing chamber, the chamber in one of the half cases can be effectively utilized. Also when the cable leading section, which has been located at the center along the partition plane of the half cases in the prior art, is positioned instead at one side in the chamber of one of the half cases, the two half cases constituting the outer casing can be made thinner, thus making it possible to make the outer casing smaller in size. Also because the two half cases are made in identical configurations, manufacturing only one type of half case suffices thus reducing the manufacturing cost.

Also in the optical cable closure of the invention, each end plate preferably has a cable fitting notch running from the circumference thereof to the cable passing hole, with each end plate being aligned in the cable leading hole so that the cable fitting notch is disposed substantially in parallel to the partition plane of the outer casing.

With this configuration, when the two half cases constituting the outer casing are joined by clamping on the partition plane, the clamping force also acts on the cable fitting notches of the end plates, thereby achieving reliable sealing of the cable fitting notches of the end plates.

To summarize, in the optical cable closure of the invention, the optical cables can be introduced in one of the half cases even when the outer casing is made from identical half cases, unlike the outer casing of the prior art, because the end plate which is plugged in the cable leading hole of the outer casing has each cable passing hole offset from the center line of the end plate, and the end plate is aligned in the cable leading hole of the outer casing so that the offset cable passing hole is brought to the bottom side of one of the half cases. Consequently, the chamber in one of the half cases can be used as the cable leading chamber as well as the linkage frame housing chamber, so that the chamber in one of the half cases can be effectively utilized. Further according to the invention, because the cable leading section, which has been located at the center along the partition plane of the two half cases in the prior art, is instead positioned at one side in the chamber of one of the half cases, the two half cases constituting the outer casing can be made thinner thus making it possible to make the outer casing smaller in size. Also because the half cases are made in identical configurations, manufacturing only one type of half case suffices thus reducing the manufacturing cost.

BRIEF DESCRIPTION OF THE DRAWINGS

These and other objects and advantages of the present invention will become more apparent and more readily appreciated from the following detailed description of the exemplary embodiments of the invention taken in conjunction with the accompanying drawings, in which.

DETAILED DESCRIPTION OF THE PREFERRED EMBODIMENT

Figure 1:
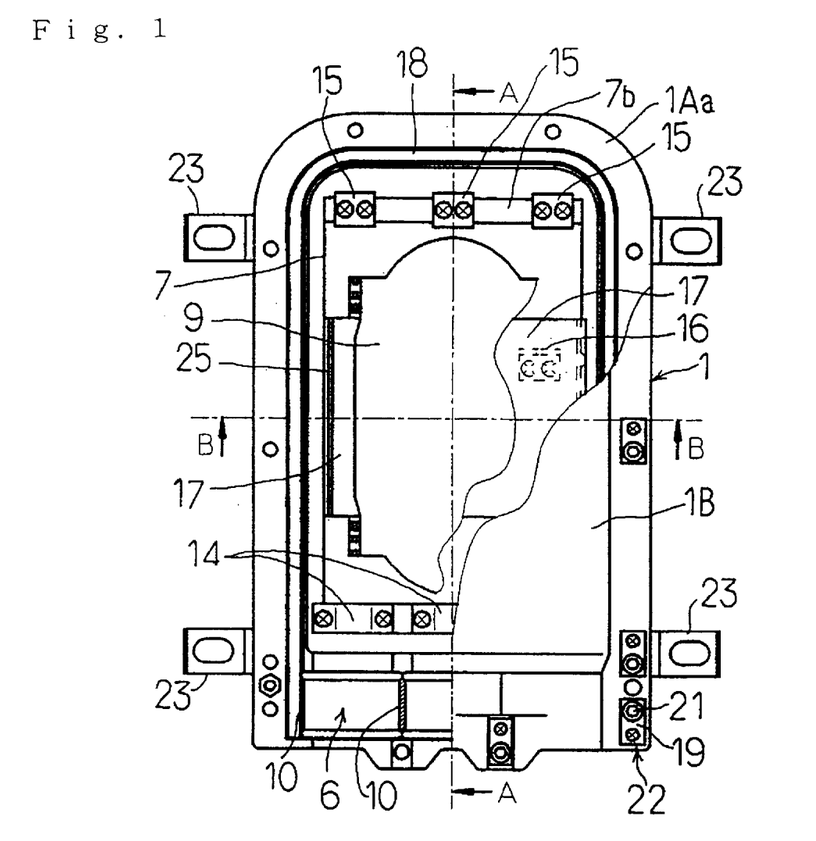
FIG. 1 is a plan view with a key portion being cutaway showing one embodiment of the optical cable closure according to the invention.
Figure 2:
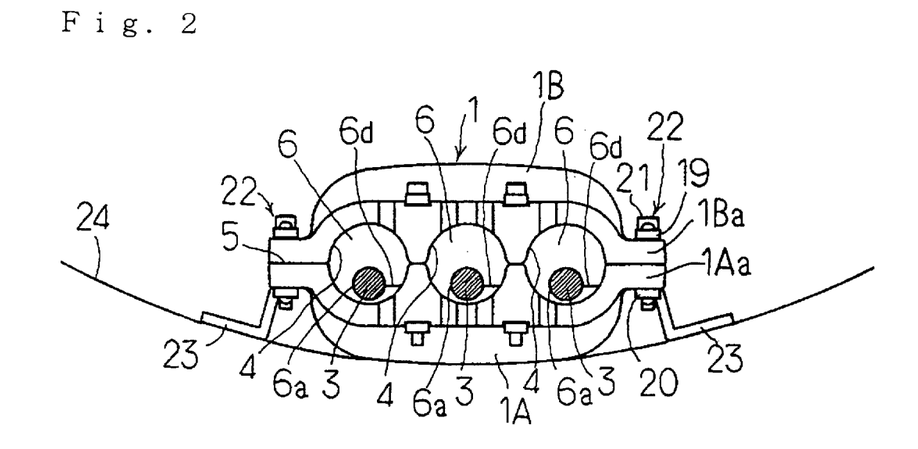
FIG. 2 is a front elevational view of the optical cable closure shown in FIG. 1.
Figure 3:
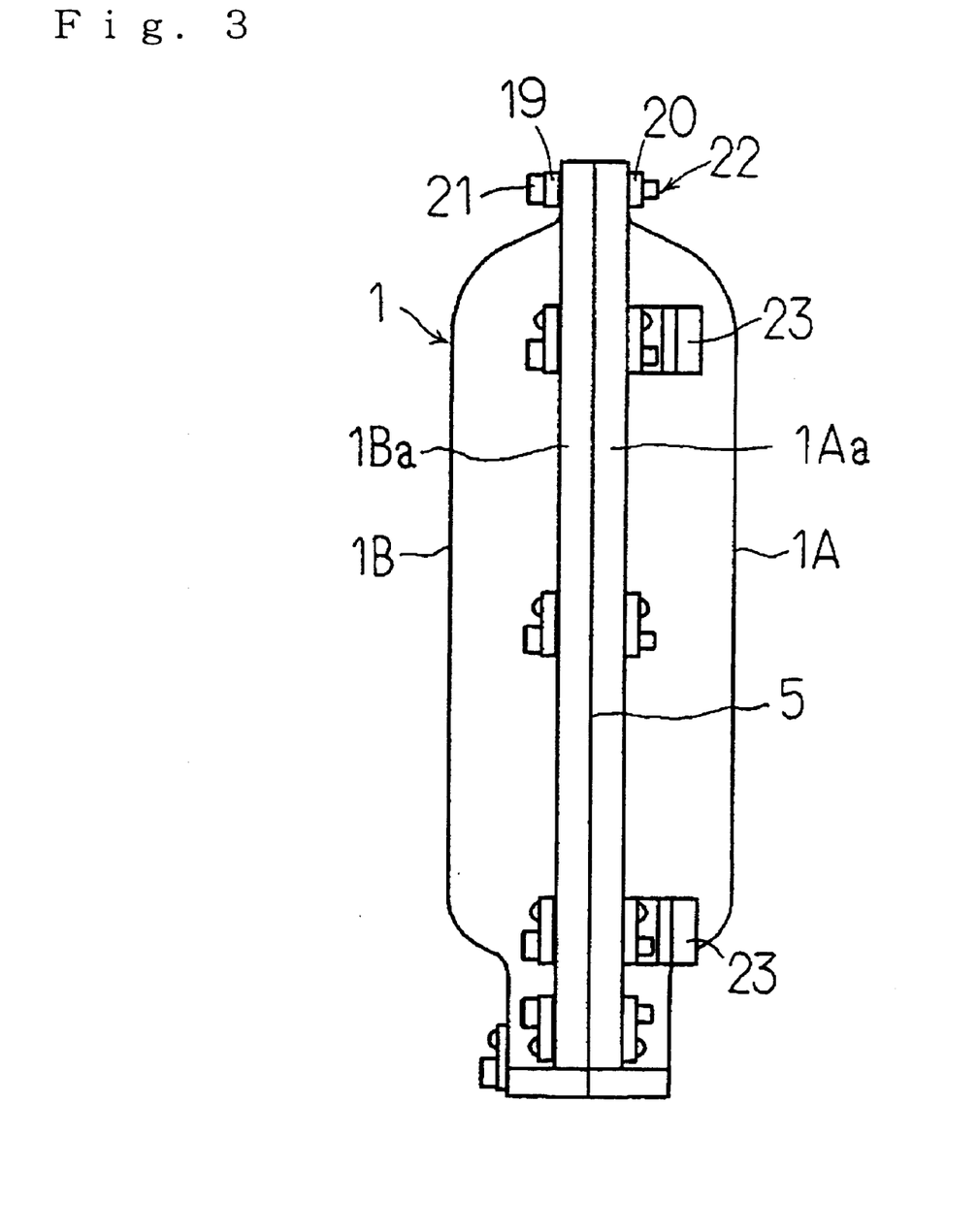
FIG. 3 is a right side view of the optical cable closure shown in FIG. 1.
Figure 4:
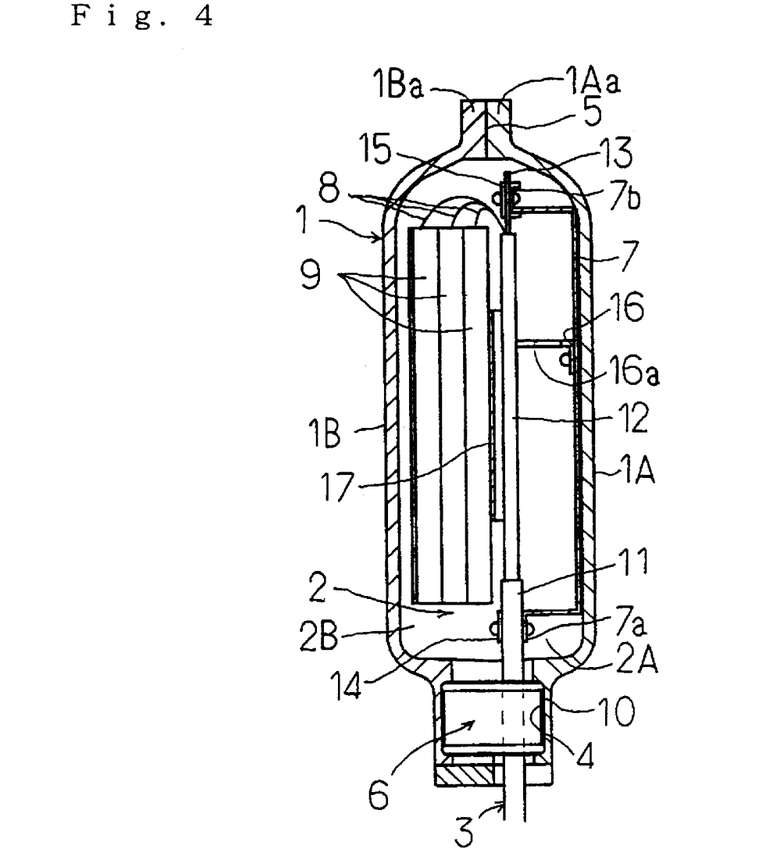
FIG. 4 is a cross sectional view along line A—A of FIG. 1.
Figure 5:
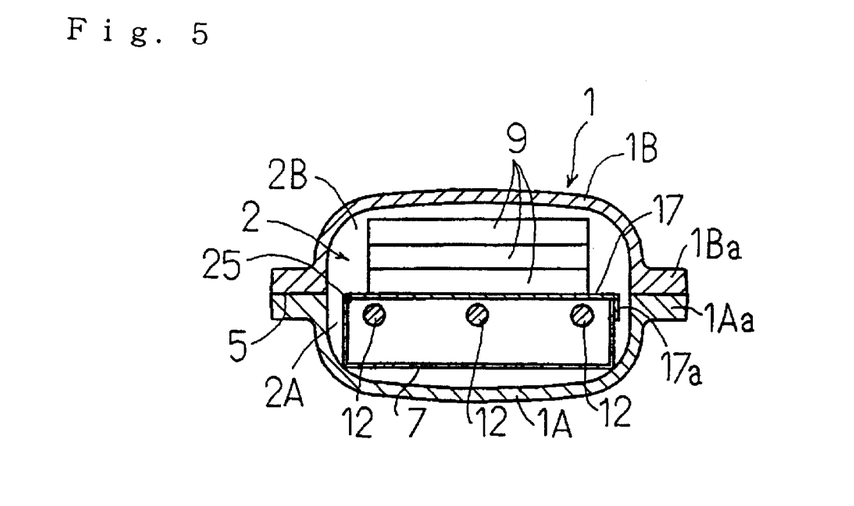
FIG. 5 is a cross sectional view along line B—B of FIG. 1.
Figure 6:
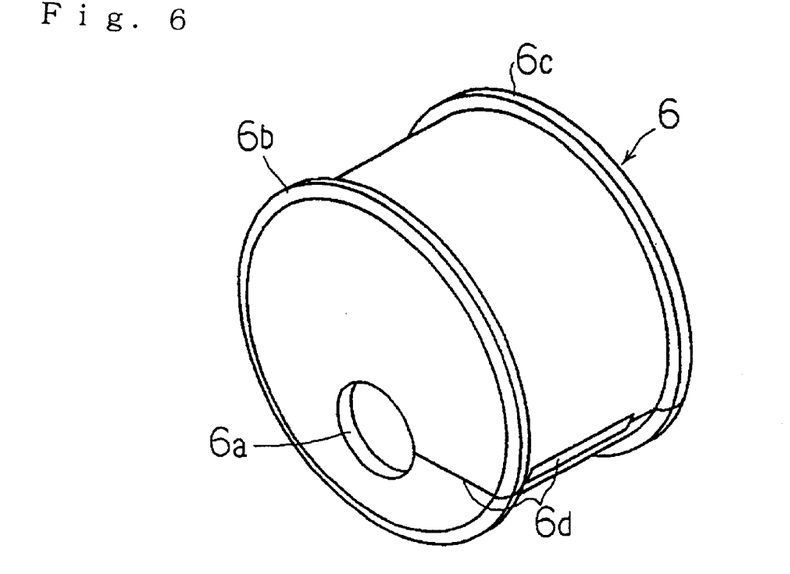
FIG. 6 is a perspective view of an end plate used in the optical cable closure of FIG. 1.
Figure 7:
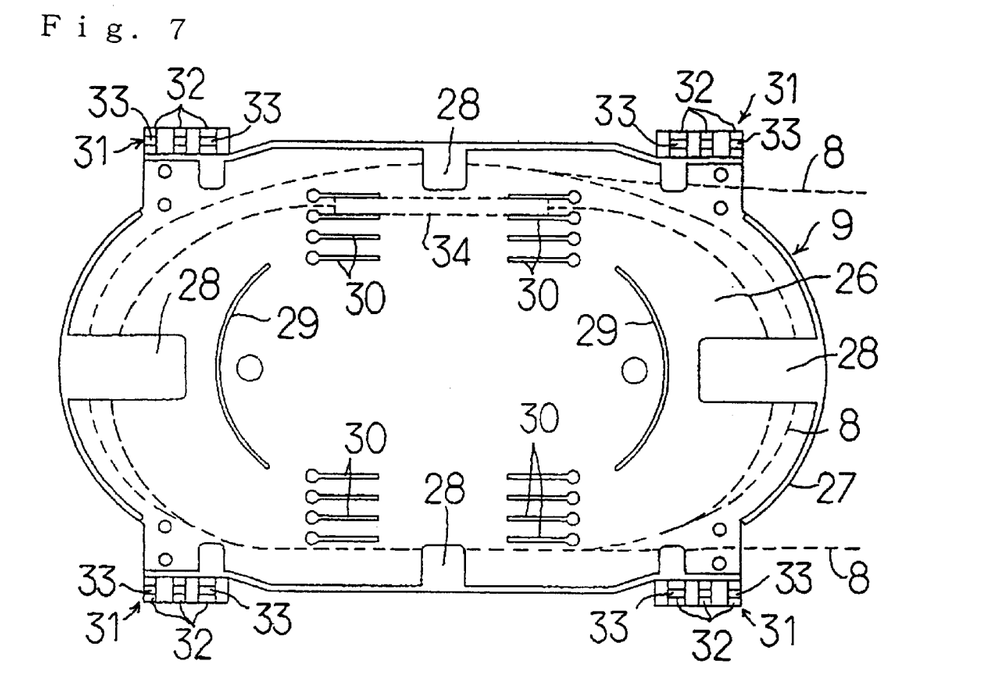
FIG. 7 is a plan view of the redundancy housing case used in the optical cable closure of FIG. 1.

FIGS. 1 through 7 show one embodiment of the optical cable closure of the invention. FIG. 1 is a plan view with a key portion being cutaway showing the optical cable closure, FIG. 2 is a front elevational view of the optical cable closure, FIG. 3 is a right side view of the optical cable closure, FIG. 4 is a cross sectional view of the optical cable closure along line A—A, FIG. 5 is a cross sectional view of the optical cable closure along line B—B, FIG. 6 is a perspective view of an end plate used in the optical cable closure and FIG. 7 is a plan view of a redundancy housing case used in the optical cable closure.

In the optical cable closure, the outer casing 1 comprises a half case 1A and a half case 1B having identical configurations. The half cases 1A and 1B are clamped together airtight by means of shims 19 and 20 which make contact with flanges 1Aa and 1Bb, respectively, and clamping means 22 of such a configuration that clamps the shims 19 and 20 with a screw 21, and a sealing member 18 being interposed between the shims 1Aa and 1Bb. Each of the clamping means 22 provided at four corners of the half case 1A has a stay 23 clamped thereon by the clamping means 22. The optical cable closure is installed on a mount 24 such as the inner wall of a manhole by means of the stays 23.

The outer casing 1 has three cable leading holes 4 provided on only one end located on the front surface thereof for introducing end portions of the optical cables 3 to be connected, with the cable leading holes 4 being arranged side by side and divided into halves by a partition plane 5 of the outer casing 1. The outer casing 1 has such a configuration that extends toward a side opposite to the side where the cable leading holes 4 are provided, with the portion on the opposite side being also made in a closed bottomed construction similar to both sides.

Plugged into each of the cable leading holes 4 and supported therein are rubber end plates 6 having a circular cross section which fits around the circumference of the optical cables 3 and seals the cable leading holes 4. The end plates 6 each have a cable passing hole 6a made along the center line thereof and flanges 6b and 6c provided on the circumference thereof at both ends in the direction of the center line and is, with a sealing tape 10 wound around the circumference between the flanges 6b and 6c, plugged into the cable leading holes 4 thereby sealing the cable leading holes 4, similar to the prior art described previously. Specifically in this embodiment, the cable passing holes 6a provided in each end plates 6 is offset from the center line of the end plate 6, and each end plate has a cable fitting notch 6d running from the circumference thereof to the cable passing holes 6a. The end plates 6 are aligned in the cable leading holes 4 of the outer casing 1 so that the offset cable passing holes 6a are located closer to the bottom side of the half case 1A than the partition plane 5 of the half case 1A as shown in FIG. 2, and the cable fitting notches 6d are disposed substantially in parallel to the partition plane 5 of the outer casing 1.

The linkage frame 7 is disposed in the chamber 2A, while the cable holder 14 provided on the upper edge 7a of one end thereof and the reinforcement holder 15 provided on the upper edge 7b of the other end thereof are also disposed in the chamber 2A of one half case 1A. Consequently, the end portions of the optical cables 3 are disposed in the chamber 2A of one half case 1A at a position closer to the bottom side of the half case 1A then the partition plane 5.

The optical cables 3 which are sealed by the end plates 6 and are introduced into the chamber 2A of one half case 1A from the cable leading holes 4 are secured by holding the sheath 11 by the cable holder 14 at the upper edge 7a on one end of the linkage frame 7, and supporting the reinforcement member consisting of the tension member 13 by the reinforcement member holder 15 at the upper edge 7b of the other end.

In the case of such a construction as the optical fiber ribbon of the optical cables 3 are housed in a metal tube which serves as a reinforcement member, a reinforcement member holder 16 is fastened onto the bottom of the linkage frame 7 by means of screws or the like, for inserting and holding the metal tube into a holding slit 16a.

Disposed in the chamber 2B of the opposite half case 1B constituting the outer casing 1 is a plurality of redundancy housing cases 9, which house the connecting portions and the redundant portions of the optical fiber ribbons 8, being stacked therein. The redundancy housing cases 9 are stacked and supported on a swingable support plate 17 which is placed to span over the box-shaped linkage frame 7 and is pivoted on one side thereof by a hinge 25 onto the linkage frame 7 to freely open or close. Specifically, the swingable support plate 17 is pivoted at one end thereof by a hinge 25 onto one side of the linkage frame 7 to freely open or close, with the other end being placed on the opposite edge of the linkage frame 7, while the end 17a on the other end of the swingable support plate 17 is bent substantially at right angles along the opposite edge of the linkage frame 7 and hooked on the opposite edge of the linkage frame 7.

Thus in the optical cable closure of this embodiment, the chamber 2A in one half case 1A on the side where the offset cable passing holes 6a of the end plates 6 are disposed in the outer casing 1 is made to serve as the cable leading chamber and the linkage frame housing chamber, and the chamber 2B in the other half case 1B of the outer casing is made to serve as the redundancy housing chamber.

As shown in FIG. 7, the redundancy housing case 9 has a bottom plate 26, while an outer wall 27 is installed on the periphery of the bottom plate 26 to erect thereon at the front side for keeping the redundant portion of the optical fiber ribbon 8 from coming out, a ribbon holder 28 is mounted on the outer wall 27 for keeping the optical fiber ribbon 8 from protruding above, an inner wall 29 is installed at the center of the bottom plate at the front side for keeping the redundant portion of the optical fiber ribbon 8 from being bent with a radius of curvature less than the tolerance, and a plurality of aligning walls 30 erected in parallel to each other for aligning a ribbon junction 34 of the optical fiber ribbon 8. Erected at four corners of the bottom plate 26 are a plurality of linkage brackets 32 of plate shape which constitute the hinge 31, mounted on the upper and lower sides of the bottom plate 26 in such a direction as the adjacent linkage brackets are in parallel to each other. Each of the linkage brackets 32 has a linkage groove 33 opening at the end thereof. Each linkage groove 33 provides an entry for inserting a linkage pin not shown with a width slightly smaller than the diameter of the linkage pin, where the pin is engaged at the bottom freely rotatable. The linkage brackets 32 are installed also on the upper side, as well as on the bottom side of the redundancy housing case, while the upper and the lower linkage brackets are positioned so that the upper linkage bracket 32 corresponds to the lower linkage bracket 32.

Members identical to the upper linkage brackets 32 having the linkage groove 33 are installed to be erected also on the top surface of the swingable support plate 17 in similar positional relationship.

When the redundancy housing chambers 9 are stacked up and down, the upward linkage brackets 32 of the lower redundancy housing cases 9 and the downward linkage brackets 32 of the upper redundancy housing cases 9 are meshed with each other in a staggered way, and the linkage grooves 33 thereof are aligned with each other under this meshed condition. When the linkage pins, not shown, are inserted in the aligned linkage grooves 33, the hinges 31 are completed at the respective positions. When the linkage pin on one side of the redundancy housing case 9 is pulled out, the redundancy housing case 9 can be opened on the hinge 31 on the opposite side. Under this condition, the redundant portion of the optical fiber ribbon 8 is contained in a loop configuration on the bottom plate 26 of the lower redundancy housing case 9, and ribbon connecting portion 34 is inserted between the alignment walls 30 and aligned. In this case, the redundant portions of the optical fiber ribbons 8 which are led in at the upper right and lower left portions on the sheet shown on the bottom plate 26 are connected to each other at the ribbon connecting portion 34 after making two turns, for example, on the bottom plate 26. Then the upper redundancy housing case 9 is placed on the lower redundancy housing case 9, and the linkage pins not shown are inserted into the aligned linkage grooves 33 of the linkage bracket 32 which are put into a mesh state from an open state, thereby putting the hinge 31 into a completed condition on the open side. In this condition, the upper redundancy housing case 9 is put into the locked condition of being unable to open with respect to the lower redundancy housing case 9.

As described above, even when the outer casing 1 is formed from the half cases 1A and 1B having identical shapes, the optical cables 3 can be introduced into the half case 1A, unlike the outer casing 1 of the prior art, by making the cable passing holes 6A of the end plates 6, which are fitted in the cable leading holes 4 of the outer casing 1 for the purpose of sealing, being offset from the center line of the end plates 6 and aligning the end plates 6 in the cable leading holes 4 so that the offset cable passing holes 6A thereof are disposed inside the half case 1A. Consequently, the chamber 2A of the half case 1A serves as the cable leading chamber and the linkage frame housing chamber. By using the chamber 2A of the half case 1A as the cable leading chamber as well as the linkage frame housing chamber, the chamber 2A of the half case 1A can be used effectively. Also when the cable leading section, which has been located at the center along the partition plane 5 of the half cases 1A and 1B in the prior art, is positioned at one side in the chamber 2A of the half case 1A, the two half cases 1A and 1B constituting the outer casing 1 can be made thinner thus making it possible to make the outer casing 1 smaller in size. Also because the two half cases 1A and 1B are made in identical configurations, manufacturing only one type of half case suffices thus reducing the manufacturing cost.

Also because each end plate 6 has a cable fitting notch 6d running from the circumference thereof to the cable passing hole 6a, with each end plate 6 being aligned in the cable leading hole 4 so that the cable fitting notch 6d is disposed substantially in parallel to the partition plane 5 of the outer casing 1, when the two half cases 1A and 1B constituting the outer casing 1 are joined together by clamping at the partition plane 5 with the clamping means 22, the clamping force acts also on the cable fitting notch 6d of the end plate 6, thereby achieving reliable sealing of the cable fitting notch 6d of the end plate 6.

The clamping means 22 for clamping the half cases 1A and 1B is formed from shims 19 and 20 and the screw 21 in the embodiment described above, although the clamping means 22 may also comprise a band or the like which clamps the half cases 1A and 1B on the circumference thereof.

When the optical cables 3 are not introduced into the outer casing 1 through the cable leading holes 4 in the embodiment described above, the cable leading holes 4 are plugged with the end plates 6 which are not provided with the cable passing holes 6a and the cable fitting notches 6d.

What is claimed:

1. An optical cable closure comprising:

a two-partition type outer casing wherein two identical half cases are joined to form chambers therein, wherein said outer casing has a plurality of cable leading holes provided on only one end thereof for introducing end portions of optical cables to be connected in such a configuration as the cable leading holes are arranged side by side and divided into halves by a partition plane of said outer casing, said cable leading hole being plugged with an end plate fitting around the circumference of said optical cable and sealing the cable leading hole and supported therein, while the chamber of the outer casing includes a linkage frame which holds said optical cable and supports a reinforcement member of said optical cable and a redundancy housing case which houses a redundant portion of the optical fiber ribbon of said optical cable, wherein each of said end plates has a cable passing hole disposed offset from the center line of said end plate and said end plate is aligned in the cable leading hole of the outer casing so that the offset cable passing hole is disposed closer to the bottom side than the partition plane inside one of the half cases, a chamber in one half case of said outer casing on the side where the offset cable passing hole of said end plate is formed as a cable leading chamber and a linkage frame housing chamber, and the chamber in the other half case of said outer casing is formed as a redundancy housing chamber.

2. The optical cable closure as set forth in claim 1, wherein each end plate has a cable fitting notch running from the circumference thereof to the cable passing hole, with said each end plate being aligned in the cable leading hole so that the cable fitting notch is substantially parallel to the partition plane of the outer casing.

* * * * *

UNITED STATES PATENT AND TRADEMARK OFFICE
CERTIFICATE OF CORRECTION

PATENT NO. : 6,085,013
DATED : July 4, 2000
INVENTOR(S) : Yatsu

It is certified that error appears in the above-indentified patent and that said Letters Patent is hereby corrected as shown below:

Col. 4, line 28: "the shims 1Aa and 1Bb" should read -- the shims 19 and 20 --.

Signed and Sealed this

Seventeenth Day of April, 2001

Attest:

NICHOLAS P. GODICI

*Attesting Officer*  *Acting Director of the United States Patent and Trademark Office*